Dec. 6, 1966 TSUNEO MORITA 3,290,449

SERVO SYSTEM FOR CONTROLLING A ROTARY MAGNETIC HEAD IN A VIDEO TAPE RECORDER

Filed Jan. 23, 1963 2 Sheets-Sheet 1

Inventor
Tsuneo Morita

Hill, Sherman, Meroni, Gross & Simpson by Attys.

Dec. 6, 1966 TSUNEO MORITA 3,290,449

SERVO SYSTEM FOR CONTROLLING A ROTARY MAGNETIC HEAD IN A VIDEO TAPE RECORDER

Filed Jan. 23, 1963 2 Sheets-Sheet 2

Inventor
Tsuneo Morita by Hill, Sherman, Meroni, Gross & Simpson Attys.

United States Patent Office 3,290,449

Patented Dec. 6, 1966

3,290,449

SERVO SYSTEM FOR CONTROLLING A ROTARY MAGNETIC HEAD IN A VIDEO TAPE RECORDER

Tsuneo Morita, Setagaya-ku, Tokyo, Japan, assignor to Sony Corporation, Tokyo, Japan, a corporation of Japan Filed Jan. 23, 1963, Ser. No. 253,509
Claims priority, application Japan, Jan. 26, 1962, 37/2,792
6 Claims. (Cl. 179—100.2)

This invention relates to a servo system suitable for use in magnetic video tape recorders, and more particularly to a servo system in which the deviation of the error signal from its correct value as a result of dropout of either one or both of a reference signal and a feedback signal the phase of which is to be compared therewith, is held as low as possible, so that an accurate and stable control of the output device of the servo system may be maintained.

One object of this invention is to provide a servo system in which the effect of a dropout in a magnetic video tape recorder servo system can be minimized.

Another object of this invention is to provide a servo system in which an astable multi-vibrator circuit is included for maintaining effective operation of the servo system in the event of a dropout.

Yet another object of this invention is to provide a servo control circuit which is particularly suitable for use in a servo system for controlling a rotary magnetic head in a magnetic video tape recorder.

Other objects, features and advantages of this invention will become apparent from the following description taken in conjunction with the accompanying drawings, in which.

Figure 1:
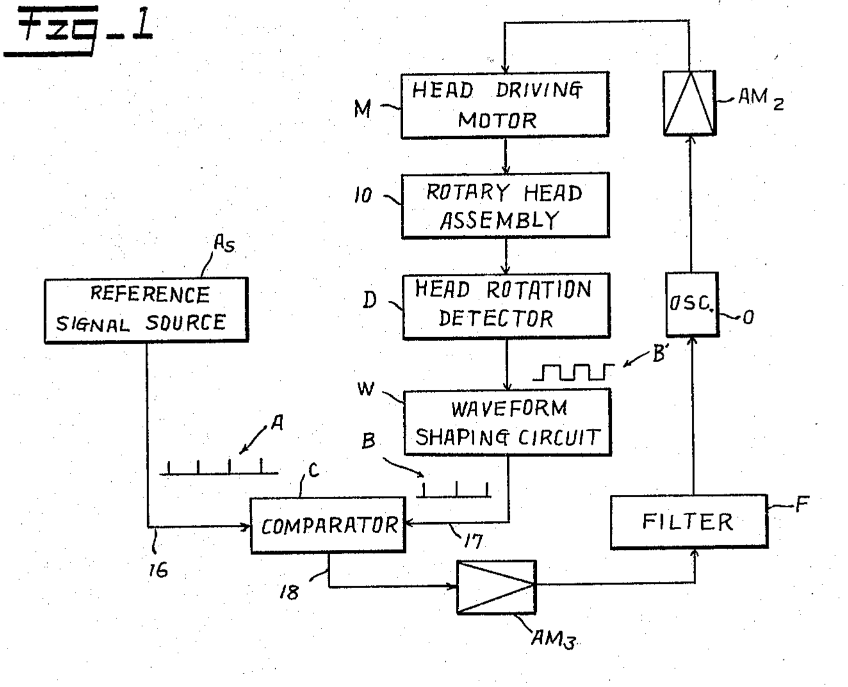
FIGURE 1 is a fundamental schematic diagram for use in explaining a servo system of a magnetic video tape recorder or the like according to this invention.

The components of a servo system in a magnetic video tape recording and reproducing system may comprise those shown in FIGURE 1, in which a synchronous motor M for operating a rotary magnetic head assembly 10 is driven by the electric output from an oscillator O; detecting means D for detecting the rate of rotation of the magnetic head assembly 10 is associated with the rotary shaft of the motor and generates a comparing or feedback signal B; the comparing signal B is applied to one input of a phase comparator C; the signal B usually has substantially the same frequency as that of a reference signal A. The reference signal A may, for example, comprise a signal reproduced from a magnetic tape, and is supplied to a second input of the comparator C, whereby the phases of the two signals A and B are compared and an error signal based upon the phase difference between the input signals is fed back to the oscillator O to control its oscillating frequency, thereby controlling the motor M and exactly synchronizing it with the reference signal A.

Figure 2:
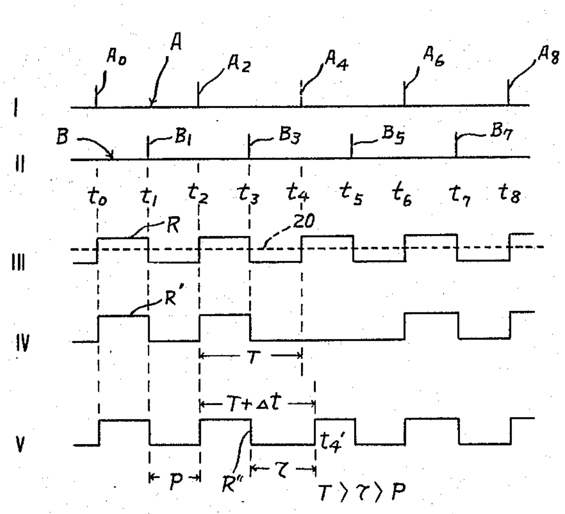
FIGURE 2 is a waveform diagram for explaining the servo system of a magnetic tape recorder of this invention.

As the reference signal A and the head rotation signal B to be compared therewith, trigger pulses are employed as shown in parts I and II of FIGURE 2. In this case, the phase comparator C is usually composed of a bistable multi-vibrator circuit, and this bistable circuit is set by each impulse of one signal, for example the reference signal A, and is reset by each pulse of the other signal, for example the head rotation responsive signal B. As a result of this, rectangular waveform signal R as shown in part III of FIGURE 2 is obtained. Then, the rectangular waveform signal is filtered by a low pass filter F to obtain a direct current error signal, and the oscillating frequency of the oscillator O is controlled to reduce the level of the direct current error signal.

In this case, if either one of the pulses A or B, for instance, impulse $A_4$ which occurs at the time $t_4$ in FIGURE 2 is dropped out, a rectangular waveform signal R′ is obtained, which signal R′ reflects an "off-state" of the bistable from time $t_3$ to time $t_6$ as illustrated in part IV of FIGURE 2. The drop out produces a direct current component of an abnormally high amplitude which substantially interferes with proper control of the head rotation speed. A drop out is very probable in the case where the reference signal A is reproduced from magnetic tape. The drop out phenomenon in the magnetic reproduction of recorded signals is well known.

From a consideration of the foregoing, this invention proposes a servo system in which the above disadvantages can be avoided by the use of an astable multi-vibrator circuit instead of a bistable multi-vibrator circuit in the comparator C of FIGURE 1.

Figure 3:
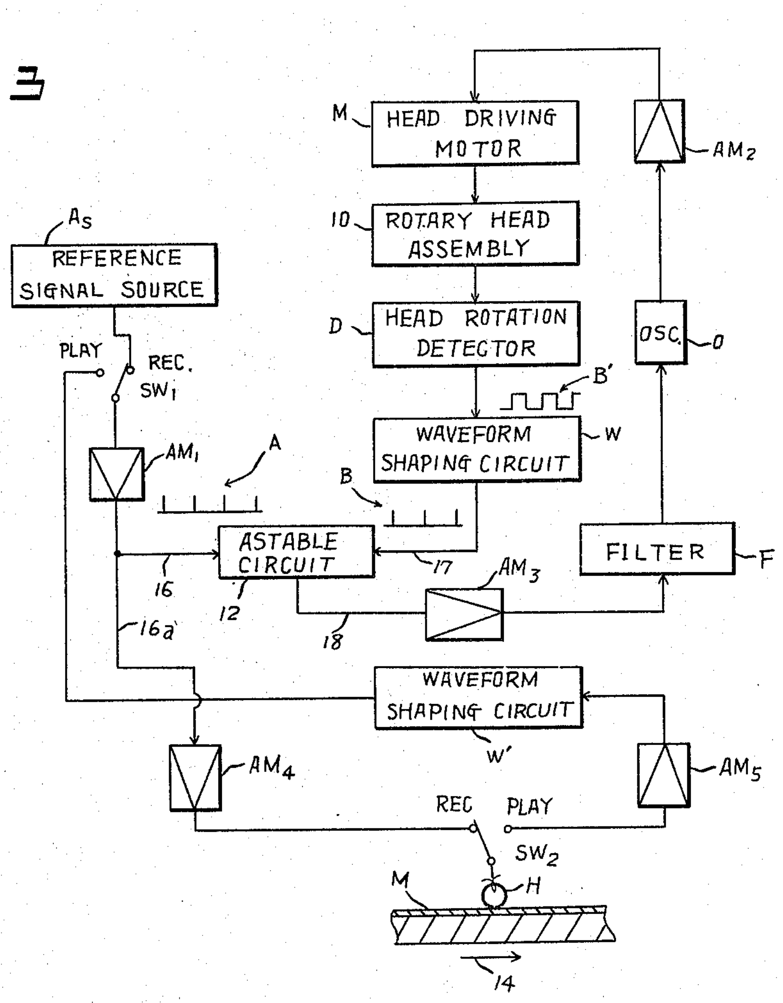
FIGURE 3 is a block diagram illustrating an example of a servo system of a magnetic video tape recorder in accordance with this invention.
Figure 4:
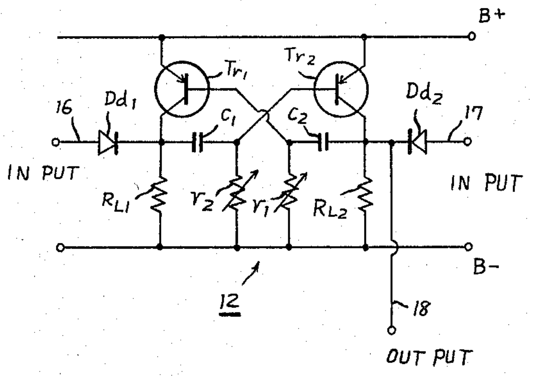
FIGURE 4 is a circuit diagram illustrating an astable multi-vibrator circuit for use in the system of FIGURE 3.

Referring to FIGURES 2, 3 and 4 of the drawings, an example of the servo system of this invention will hereinbelow be explained. In FIGURE 2, the phase difference between pulse signals A and B when the head rotation is properly synchronized, namely the time interval between an impulse of the signal A and the next succeeding impulse of the signal B is designated by the letter P. This time interval usually corresponds to a phase angle of about 180°. The period of repetition of the signal A is designated by the letter T, and in this invention the oscillating period (the time duration of the quasi-stable multivibrator in the absence of a driving pulse forcing a change of state) is selected to be such that $T>\tau>P$. The oscillation of the astable multi-vibrator 12 is locked in step with both pulse signals A and B. For example, pulses $A_0$, $A_2$, $A_4$, $A_6$, etc. may drive the astable to its "on" condition while pulses $B_1$, $B_3$, $B_5$, $B_7$, etc. may drive the astable to its "off" condition to produce a rectangular waveform signal R as shown in part III of FIGURE 2. If, however, the impulse $A_4$ of the signal A is dropped out at the time $t_4$, the astable multi-vibrator is not driven to its "on" condition at the time $t_4$ and remains "off" for the duration of the predetermined natural time constant $\tau$ and turns "on" automatically at the time $t'_4$ as indicated in part V of FIGURE 2. That is, the astable multivibrator does not remain "off" until the arrival of an impulse $A_6$ as in the case where comparator C in FIGURE 1 comprises a bistable multi-vibrator circuit. Accordingly it turns "on" after only a slight lapse of time $\Delta t$ from the dropout time $t_4$, and the rectangular waveform signal R″ shown in part V of FIGURE 2 is obtained. The variation of the direct current error signal component obtained from waveform R″ can be made to be very slight as compared to the variation produced by waveform R′.

FIGURE 3 illustrates a case in which the servo system of this invention is employed in a magnetic video tape recording and reproducing device. During recording reference signal A is supplied under the control of a switch $SW_1$ through an amplifier circuit $AM_1$ to the astable multivibrator 12 from a reference signal source $A_s$ having a frequency of, for example, 60 cycles per second obtained from the vertical synchronizing signal of a television signal being recorded. At the same time, the output of the oscillator O is amplified by an amplifier $AM_2$, and drives the motor M. The signal B is supplied to the astable multivibrator 12 from the head rotation detecting device D coupled to the shaft of the motor M. The output of the astable multivibrator 12 such as shown in part V of FIGURE 2 is supplied through an amplifier $AM_3$ to the filter F to obtain a direct current component or error signal representing the average value of the rectangular waveform signals R″. The error signal is fed back to the oscillator O to control it in a direction to reduce the magnitude of the error signal. During recording, the reference signal from source $A_s$ is supplied directely to a control head H through a head amplifier $AM_4$ and a changeover switch $SW_2$, so that control signal tracks are formed on one edge of a magnetic tape M moving in the direction of arrow 14.

The astable component 12 may utilize any desired circuit. In the embodiment shown in FIGURE 4, however, transistors $Tr_1$ and $Tr_2$ are provided, the collector of one transistor $Tr_1$ being connected through a coupling capacitor $C_1$ to the base of the other transistor $Tr_2$ and the collector of the transistor $Tr_2$ being connected to the base of the transistor $Tr_1$ through a coupling capacitor $C_2$. Resistors $r_1$ and $r_2$ are connected respectively to the bases of the transistors $Tr_1$ and $Tr_2$ and input terminals are respectively connected to the collectors of the transistors $Tr_1$ and $Tr_2$ through directional diodes $Dd_1$ and $Dd_2$. $RL_1$ and $RL_2$ are collector load resistors of the transistors $Tr_1$ and $Tr_2$. The output of this astable multivibrator 12 can be led from the collector of the transistor $Tr_2$, for example.

By changing suitably the values of the resistors $r_1$ and $r_2$ and/or the coupling capacitors $C_1$ and $C_2$, the oscillating period $\tau$ of each quasi-stable state of the astable multivibrator 12 may be selected as desired. One example of this invention is as follows:

| | | |
|---|---|---|
| $C_1$, $C_2$ | microfarads | 0.5 |
| $r_1$, $r_2$ | ohms | 100,000 |
| $RL_1$, $RL_2$ | do | 5,600 |
| B+ | volts, D.C. | 12 |

As is well known, in the rotary phase detector D, signal B may be obtained by the so-called non-contact photoelectric means in which a rotary disk is mounted on the shaft of the rotary magnetic head assembly 10 (not the magnetic head H). One or more pairs of reflecting and non-reflecting faces are provided on the outer periphery of the disk. The number of pairs of faces may correspond to the number of rotary heads where each head scans one sub-frame of a video signal so that the output waveform from detector D has a frequency of about 60 cycles per second to correspond with the reference signal A of 60 cycles per second, referred to herein. A light beam is radiated onto the outer periphery of the disk and the reflected light is received by a photo-transistor to generate one cycle of the output signal for each pair of faces scanned. The signal B may be obtained also in a non-contact electromagnetic means wherein a magnet is provided on the outer periphery of the rotary disk and a magnetic head is disposed on a fixed part and coupled to the path of the magnet for energization thereby during each revolution of the magnet. In some cases, the rotary phase detecting circuit may be of a brush or a commutator type.

The inputs to the astable circuit may include suitable wave shaping or triggering circuitry W and W′ to convert the output of the detector D and the output of head H, respectively, to the pulse waveforms indicated at parts I and II of FIGURE 2 where necessary.

During reproducing, the switches $SW_1$ and $SW_2$ are changed over, whereby the output from the control magnetic head H is applied to the astable multivibrator 12 through amplifiers $AM_5$ and $AM_1$, which output is employed as a reference signal. The same operation and effect as previously described for recording may be obtained during playback to synchronize rotation of head assembly 10 with the control signal on tape M.

The above description has been made in connection with a case where the phase difference of the two signals A and B is 180° in a normal condition, so that the time period $\tau$ for the "on-state" of the astable circuit 12 (transistor $Tr_2$ cut off) may be the same as for the "off-state" (transistor $Tr_2$ conducting). The phase difference may of course be predetermined to be a desired value, and the value of the timer period $\tau$ for the "off-state" and for the "on-state" of the astable multivibrator 12 may be changed correspondingly and be different from each other. The values of the time periods $\tau$ for the "on-state" and for the "off-state" may be adjusted as desired by changing the values of the resistors $r_1$ and $r_2$ and/or the capacitors $C_1$ and $C_2$ in FIGURE 4.

The duration $\tau$ of the quasi-stable states of the astable circuit 12 may be selected to be equal to or slightly greater than the maximum time interval between successive pulses of signals A and B to be responded to by the servo system. Thus if the maximum phase error of the servo system is 10° (corresponding to a phase difference of 170° or 190°), the natural time period $\tau$ may correspond to a phase angle of 190°.

*Summary of operation*

Where the comparator C in FIGURE 1 is an astable circuit such as indicated in FIGURE 4, the operation of the embodiments of FIGURES 1 and 3 are similar and the operation of the embodiment of FIGURE 1 will be readily understood from the following summary of the operation of the embodiment of FIGURE 3.

During recording, switches $SW_1$ and $SW_2$ are in the positions shown in FIGURE 3. A reference signal such as indicated at part I of FIGURE 2 is then supplied via line 16 to astable circuit 12 and via line **16*a* to control head H. A second signal generated by detector D and representing the rate of rotation of rotary magnetic head assembly 10 may have the waveform indicated in part II of FIGURE I or may be converted to this waveform by means of suitable input circuitry associated with input 17 of astable circuit 12** or with head rotation detector circuit D. For example, if head rotation detector D supplies a rectangular waveform signal B′, a waveform shaping circuit W may differentiate this waveform and transmit the positive pulses of the differentiated signal as signal B.

When the head driving motor M is exactly synchronized with the signal from reference signal source $A_s$, pulses $B_1$, $B_3$, $B_5$, $B_7$, etc. will have a 180° phase relationship with respect to pulses $A_0$, $A_2$, $A_4$, $A_6$, $A_8$, etc., for example. In this case, astable circuit 12 will be driven from one quasi-stable condition to the other at a rate determined by the timing of signals A and B to generate a rectangular waveform R shown in part III of FIGURE 2 at output line 18 of the astable circuit 12. The filter F converts the rectangular waveform R to a direct current component indicated at 20 in part III of FIGURE 2 which represents the average value of the waveform R. When motor M is synchronized with signal A, the average value indicated at 20 is zero representing a zero error signal in the servo system. If the speed of the motor M increases from the value determined by the A signal, the phase difference between the A and B signals will change to produce a direct current error signal at the output from filter F whose magnitude is a function of the error in phase between signals A and B and whose polarity indicates the direction of the phase difference. This direct current error signal will act on the oscillator O so as to change the motor speed, in this case to reduce the motor speed, until the direct current error signal is reduced to zero.

If there should be a drop out in one of the signals A or B such as indicated at $A_4$ in part I of FIGURE 2, then a waveform as indicated in part V of FIGURE 2 is generated since the astable circuit 12 spontaneously shifts from one condition to the opposite condition at time $t'_4$ in the absence of pulse $A_4$. Heretofore, such a dropout of pulse $A_4$ would produce an output waveform as indicated in part IV of FIGURE 2. The time period $\tau$ of astable circuit 12 in each of its quasi-stable states should be somewhat greater than the phase difference indicated at P in FIGURE 2 and preferably is equal to or greater than the time interval corresponding to the maximum phase difference to which the oscillator O or other component of the system is designed to respond. Thus, if the maximum frequency change which is to be produced by the oscillator O corresponds to a phase error between signals A and B of 10°, then the time interval $\tau - P = \Delta t$ may correspond to or be greater than a phase error of 10°. It will be appreciated that any maximum error signal which is produced by the oscillator O acts on the motor M for a substantially greater time period in the case of waveform R′ than in the case of the waveform R″ and thus a dropout introduces a greatly reduced control error in the latter case.

During playback, switches $SW_1$ and $SW_2$ are placed in the opposite positions from those indicated in FIGURE 3, and the reference signal recorded on the tape M is reproduced by the control head H and supplied to astable circuit 12 via amplifiers $AM_5$ and $AM_1$. The output circuit of head H may include suitable wave shaping circuitry such as indicated at W′ so as to supply a reference signal such as indicated at A in part I of FIGURE 2 to input line 16 of astable circuit 12. Again during playback, if there is a dropout in the A or B signals such as indicated at $A_4$, the astable circuit 12 will spontaneously shift at time $t'_4$ from its quasi-stable state which it occupied at time $t_4$ so as to avoid the large error introduced by waveform R′.

It will be apparent that many modifications and variations may be effected without departing from the scope of the novel concepts of the present invention.

What is claimed is:

1. A servo system of a driving device for a magnetic recorder or the like comprising
   (a) a reference signal source for supplying a reference signal,
   (b) detecting means for producing a comparing signal corresponding to the operation of said driving device, and
   (c) an astable circuit having inputs coupled respectively to said reference signal source and said detecting means to drive said astable circuit between respective operating conditions in locked relation to said reference signal and said comparing signal for detecting the phase difference between said two signals,
   (d) the natural time period of one of said operating conditions of said astable circuit being selected longer than the period corresponding to the phase difference of said reference signal and said comparing signal and being of a value to minimize the effect of a dropout of one of said signals.

2. A servo system of a driving device for a magnetic recorder or the like as claimed in claim 1, wherein
   (e) said astable circuit is provided with a natural time period $\tau$ where $T > \tau > P$, and P is the time period corresponding to the phase difference between a pulse of the comparing signal and the succeeding pulse of the reference signal when the signals are in a predetermined synchronized relationship and T is the period of the reference signal.

3. A servo system as claimed in claim 2, wherein
   (f) P corresponds to a phase difference of about 180°.

4. A servo system of a magnetic recording and reproducing device comprising
   (a) a motor having an output means for driving a rotary magnetic head,
   (b) detecting means coupled with said motor output means for generating an output signal in accordance with head rotation,
   (c) an oscillator for controlling the speed of operation of said motor,
   (d) an astable circuit for comparing the phase of a reference signal with the phase of the output signal of said detecting means to provide an actuating signal at the output thereof,
   (e) means connected to the output of said astable circuit to receive said actuating signal therefrom and controlling said oscillator in accordance with said actuating signal to tend to maintain the motor in synchronism with the reference signal, and
   (f) means for recording the reference signal on a magnetic tape.

5. A servo system for controlling a driving device of a magnetic recorder or the like comprising
   (a) detecting means for producing a first signal varying in accordance with the speed of operation of the driving device,
   (b) means for supplying a second reference signal with which the speed of operation of said driving device is to be coordinated,
   (c) control means for controlling the speed of operation of said driving device, and
   (d) comparing means having first and second inputs for connection respectively with said detecting means and said reference signal supplying means for generating an output error signal for controlling said control means and having an output for connection with said control means to supply said output error signal to said control means,
   (e) said comparing means being responsive to a predetermined actuating waveform occurring in each cycle of each of the first and second signals to be driven to a first condition in response to one of the signals and to be driven to a second condition in response to a second of the signals, and
   (f) at least one of said conditions of said comparing means being a quasi-stable condition and the comparing means having a natural time period in said one quasi-stable condition slightly greater than the maximum phase difference between said first and second signals to return to the other condition thereof spontaneously in the event of a dropout at the actuating waveform portion of one of the signals and thus to minimize the error in control of said driving device in the event of a dropout.

6. A servo system for controlling a magnetic transducing operation comprising
   (a) head driving means for driving a magnetic transducer head assembly,
   (b) detecting means coupled to said head driving means for producing a first signal in accordance with the speed of operation of said head driving means,
   (c) magnetic head means for scanning a control track on a record medium to produce a second reference signal with which the speed of operation of said head driving means is to be coordinated during a transducing operation,
   (d) control means for controlling the speed of operation of said head driving means,
   (e) comparing means having first and second inputs for connection respectively with said detecting means and said magnetic head means to compare said first signal and said second reference signal and to generate an output actuating signal for controlling said control means and having an output for connection with said control means to supply said output actuating signal to said control means,
   (f) said comparing means comprising an astable circuit responsive to a predetermined actuating waveform occurring in each cycle of each of the first and second signals to be driven to a first quasi-stable condition in response to one of the signals and to be driven to a second quasi-stable condition in response to a second of the signals, and
   (g) said astable means having natural time periods in the respective quasi-stable conditions which are slightly greater than the respective maximum phase differences between said first and second signals and between said second and first signals to shift from each quasi-stable condition to the other spontaneously in the event of a dropout at the actuating waveform portion of the corresponding one of said signals and thus to minimize the error in control of said head driving means in the event of a dropout.

References Cited by the Examiner

UNITED STATES PATENTS 3,210,464 10/1965 Felgel-Farnholz ---- 179—100.2

BERNARD KONICK, *Primary Examiner.*

A. I. NEUSTADT, *Assistant Examiner.*